Sept. 19, 1961 R. A. DEIBEL ET AL 3,000,032
WINDSHIELD CLEANER CONTROL
Filed June 19, 1957
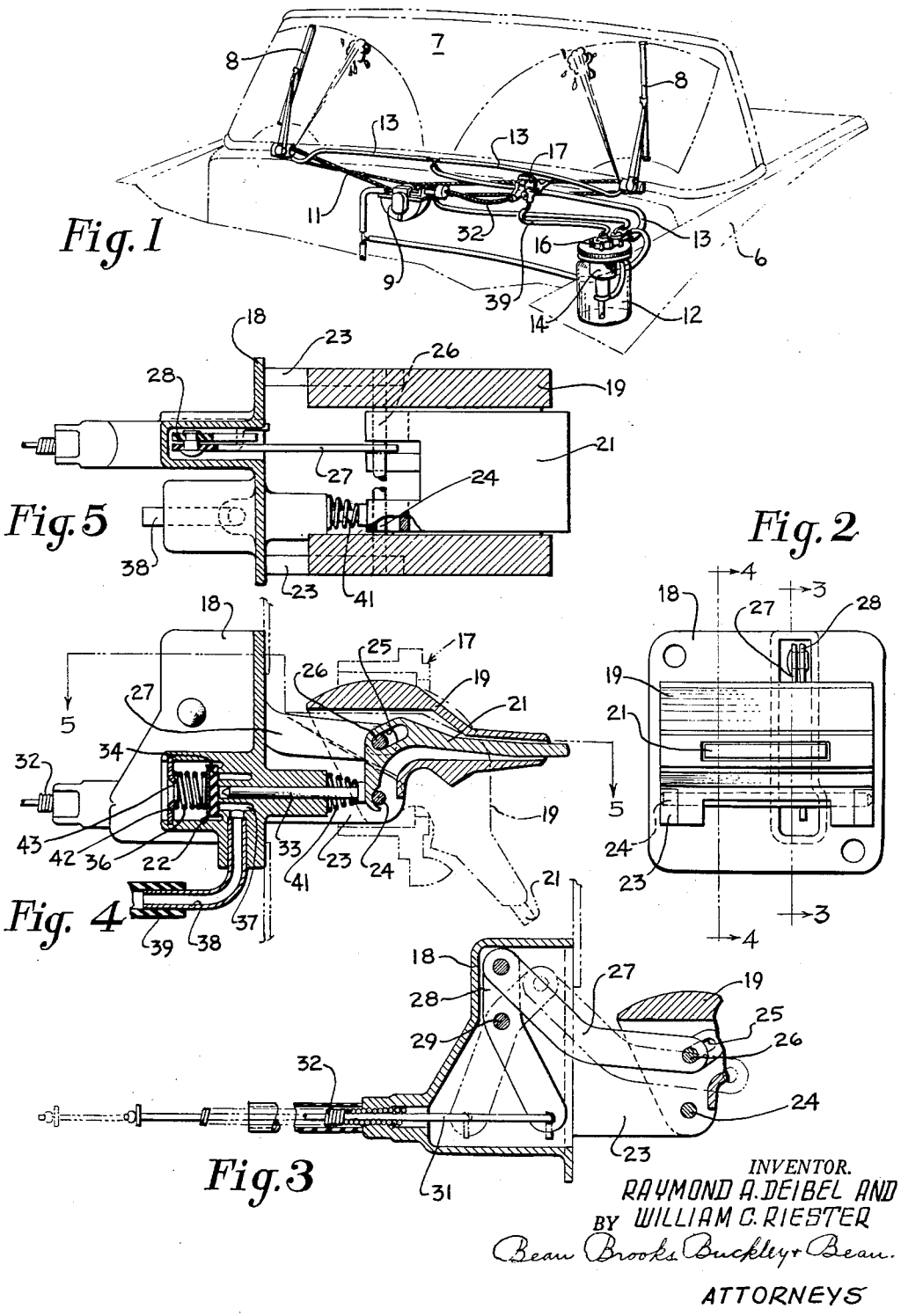
INVENTOR.
RAYMOND A. DEIBEL AND
BY WILLIAM C. RIESTER
Bean Brooks Buckley & Bean
ATTORNEYS United States Patent Office 3,000,032
Patented Sept. 19, 1961

3,000,032
WINDSHIELD CLEANER CONTROL
Raymond A. Deibel, Cheektowaga, and William C. Riester, Buffalo, N.Y., assignors to Trico Products Corporation, Buffalo, N.Y.
Filed June 19, 1957, Ser. No. 666,525
4 Claims. (Cl. 15—250.02)

This invention relates to a vehicle windshield cleaner system, and more particularly to a control means for a vehicle windshield cleaner system.

The ever present trend in motor car design toward simplification of the controls to be manipulated by the vehicle operator, for reasons of safety and convenience, has led to many improvements. The present invention represents an improvement in a control for a windshield cleaner system which features extreme simplicity of design and convenience of operation, both of which contribute to the safe operation of the vehicle. The control means of the invention may be used for the regulation of wiper motor speed, and also initiation of a windshield cleaning operation.

The main object of this invention is to provide a control means for a vehicle windshield cleaner system which is of simple structure and affords convenient use, both of which contribute to the safe operation of the vehicle.

A further object of this invention is to provide a control means for a vehicle windshield cleaner system that may be used either for wiper motor speed control, or for initiation of a windshield cleaning operation.

These and other objects and features of the invention will become more apparent from the following description and the accompanying drawing wherein:

FIG. 1 is a fragmentary perspective view illustrating a vehicle windshield cleaner system incorporating a control means of the invention;

FIG. 2 is an end view of the control means of FIG. 1;

FIG. 3 is a section view as seen from line 3—3 in FIG. 2;

FIG. 4 is a section view as seen from line 4—4 in FIG. 2; and

FIG. 5 is a section view as seen from line 5—5 in FIG. 4.

Referring now to the drawing and more particularly to FIG. 1, the numeral 6 identifies a motor vehicle having a windshield 7 on which are mounted a pair of wiper blade assemblies 8, arcuately driven by a wiper motor 9 via a transmission system in the form of cables 11. A windshield washing system, including a reservoir and conduits 13, is arranged for providing a windshield washing operation. The reservoir 12 includes a vacuum operated pump 14 and a coordinator means 16, the latter of which is adapted to cause the simultaneous operation of the wiper motor 9 and the pump 14. The coordinator 16 is so arranged that upon disruption of a balanced pressure condition therein, a complete pump operating cycle will occur. For further details of the coordinator structure and operation, reference may be had to the copending application of W. C. Riester, Serial No. 624,910, filed November 28, 1956, now Patent No. 2,860,362, issued November 18, 1958.

A control means 17, embodying the principles of the invention, includes a housing and bracket portion 18, a rotatable lever 19, a shiftable operator 21, and a valve assembly 22. The portion 18 has a pair of arms 23 which support a shaft 24 upon which the rotatable lever 19 is pivoted. A shaft 26 is supported by the rotatable lever 19 and is arranged to receive one end of a link 27, the other end of the link being pivotally affixed to a lever 28.

Lever 28 is pivotally mounted upon a shaft 29 which is mounted within the housing portion 18, the lower end of the lever 28 having affixed thereto a wire 31 forming part of a Bowden cable arrangement 32, the opposite end of the wire connecting with the slide valve of the wiper motor 9. The slidable operator 21 is L-shaped, the longer leg extending beyond the edge of the rotatable lever 19, the shorter leg being in abutment with the end of a pin 33. A slot 25, formed in the operator 21 and containing the shaft 26, allows movement of the operator 21 to shift the pin 33. Movement of the pin 33 causes unseating of a disc valve 34 which is held by a compression spring 36 upon the open end of a valve groove 37 being arranged in open communication with a nipple 38. A hose 39 connects the nipple 38 with a vacuum source such as the engine intake manifold (not shown). A compression spring 41 urges the end of the pin 33 against the end of the slidable operator 21 keeping the latter in engagement with the shaft 24. A washer 42, having a hole 43 is arranged on one end of the spring 36, the hole providing venting to atmosphere of the hose 39 when the valve 34 is unseated by the pin 33.

It will be seen that as the lever 19 is rotated clockwise about the shaft 24, the link 27 will cause rotation of the lever 28 about the shaft 29 to thereby move the cable wire 31 away from the control means and cause shifting of the wiper motor valve. The lever 19 may be left in any rotated position to achieve desired wiper speed; upon counter rotation of the lever 19, the link 27 will move the lever 28 so that the wire 31 will be drawn back toward the control means resulting in shut off of wiper motor operation.

To initiate a windshield cleaning operation, the operator need only push inwardly on the end of the shiftable operator 21 thus moving the operator forwardly and causing movement of the pin 33 and unseating of the valve 34. As a result, air under atmospheric pressure will enter the nipple 38 to cause an unbalance of pressure in the coordinator 16 resulting in a complete windshield washing and wiping operation.

From the foregoing it will be seen that the control means of the invention provides a convenient means for regulating wiper motor speed, or initiating a windshield cleaning operation.

The forgeoing description has been given in detail without thought of limitation since the inventive principles involved are capable of assuming other physical embodiments without departing from the spirit of the invention and the scope of the appended claims.

What is claimed is:

1. In a vehicle windshield cleaner system, a control means including a housing and bracket portion, a lever mounted on said portion for pivotal movement and operable to cause movement of a wiper motor control cable, an operator mounted within the lever for pivotal movement therewith, said operator being shiftable relative to said lever, said pivotal movement of said lever being about an axis transverse to the direction in which said operator is shiftable, and a valve assembly having a valve which is maintained in a first position in all positions of said lever when said operator is not shifted, said valve being movable to a second position by shifting movement of said operator.

2. In a vehicle windshield cleaner system, a control means including a housing and bracket portion, a lever pivotally mounted within said portion and operable to cause movement of a wiper motion control cable, a L-shaped operator mounted upon a shaft supported within said lever, said L-shaped operator projecting outwardly at one end from the lever and engaging at the other end a valve actuating pin, said L-shaped operator being slidable to cause movement of said pin, and a valve assembly arranged in said portion and having a valve maintained in seated position to prevent flow of air under atmospheric pressure into a hose connection arranged in said portion, said valve being unseated by movement of said pin to allow flow of air under atmospheric pressure into the hose connection.

3. In a vehicle windshield cleaner system, a control means including a housing and bracket portion, a lever mounted for pivotal movement about a given axis on said portion, a linkage arrangement extending between the lever and a wiper motor control cable adapted to provide movement of the cable when the lever is pivoted, a L-shaped operator mounted upon a shaft supported within the lever, said L-shaped operator projecting outwardly at one end from the lever and engaging at the other end a valve actuating pin, said L-shaped operator being slidable in a direction transverse to said given axis to cause movement of said pin, and a valve assembly arranged in said portion and having a valve maintained in seated position to prevent flow of air under atmospheric pressure into a hose connection arranged in said portion, said valve being unseated by movement of said pin to allow flow of air under atmospheric pressure into the hose connection.

4. In a vehicle windshield cleaner system, a control means including a housing having a bracket portion, a lever mounted on said bracket portion for pivotal movement and operable for controlling a wiper motor, an operator mounted relative to said lever for pivotal movement therewith, said operator being shiftable relative to said lever, said pivotal movement of said lever being about an axis transverse to the direction in which said operator is shiftable, and washer control means adapted to be maintained in an off position in all positions of said lever when said operator is pivoted with said lever but is not shifted relative to said lever, said washer control means being adapted to actuate said washer when said operator is shifted relative to said lever.

References Cited in the file of this patent

UNITED STATES PATENTS

| | | |
|---|---|---|
| 662,358 | Grossman | Nov. 20, 1900 |
| 1,795,645 | Eich | Mar. 10, 1931 |
| 2,553,280 | Rossire | May 15, 1951 |
| 2,632,471 | Horton | Mar. 24, 1953 |
| 2,743,473 | Oishei | May 1, 1956 |
| 2,754,505 | Kenyon | July 10, 1956 |

FOREIGN PATENTS

| | | |
|---|---|---|
| 201,108 | Australia | Feb. 17, 1956 |